US010103781B2

(12) United States Patent
Bellenger et al.

(10) Patent No.: US 10,103,781 B2
(45) Date of Patent: Oct. 16, 2018

(54) CONTACTLESS DATA EXCHANGE BETWEEN MOBILE DEVICES AND READERS INVOLVING VALUE INFORMATION NOT NECESSARY TO PERFORM A TRANSACTION

(71) Applicant: Visa International Service Association, San Francisco, CA (US)

(72) Inventors: Thomas Bellenger, San Mateo, CA (US); Oleg Makhotin, Castro Valley, CA (US); Christian Aabye, Foster City, CA (US); Erick Wong, Menlo Park, CA (US); Sanjeev Sharma, Sunnyvale, CA (US); Hao Ngo, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 100 days.

(21) Appl. No.: 15/048,849

(22) Filed: Feb. 19, 2016

(65) Prior Publication Data

US 2016/0248479 A1     Aug. 25, 2016

Related U.S. Application Data

(60) Provisional application No. 62/118,726, filed on Feb. 20, 2015, provisional application No. 62/258,153, filed on Nov. 20, 2015.

(51) Int. Cl.
*H04B 5/00* (2006.01)
*H04W 4/00* (2018.01)
*H04W 4/80* (2018.01)

(52) U.S. Cl.
CPC ......... *H04B 5/0031* (2013.01); *H04W 4/008* (2013.01); *H04W 4/80* (2018.02)

(58) Field of Classification Search
None
See application file for complete search history.

(56) References Cited

U.S. PATENT DOCUMENTS

| 8,811,892 B2 | 8/2014 | Khan et al. |
| 2009/0075592 A1 | 3/2009 | Nystrom et al. |
| 2010/0051685 A1 | 3/2010 | Royyuru et al. |
| 2010/0325052 A1 | 12/2010 | Sahota et al. |
| 2011/0244796 A1* | 10/2011 | Khan .................. H04W 4/008 455/41.1 |
| 2012/0011070 A1* | 1/2012 | Ward .................. G06Q 20/20 705/72 |
| 2012/0109764 A1* | 5/2012 | Martin ................ G06Q 20/204 705/17 |
| 2012/0130839 A1 | 5/2012 | Liang |

(Continued)

OTHER PUBLICATIONS

International Search Report dated Jun. 29, 2016, PCT Application No. PCT/US2016/018750.

(Continued)

*Primary Examiner* — Alejandro Rivero
(74) *Attorney, Agent, or Firm* — Kilpatrick Townsend & Stockton LLP

(57) ABSTRACT

Embodiments of the disclosure are directed to performing a transaction between a mobile device and an access device. Value information is provided to the access device by the mobile device. The value information is not necessary to complete the transaction.

18 Claims, 9 Drawing Sheets

(56) References Cited

U.S. PATENT DOCUMENTS

| | | |
|---|---|---|
| 2013/0282459 A1 | 10/2013 | Smets et al. |
| 2013/0317924 A1 | 11/2013 | Bush et al. |
| 2013/0331029 A1* | 12/2013 | Tang .................... H04W 4/003 455/41.1 |
| 2014/0006290 A1 | 1/2014 | Hozanne et al. |
| 2014/0074616 A1* | 3/2014 | Johnson ................ G06Q 30/02 705/14.64 |
| 2015/0020160 A1 | 1/2015 | Morpho |

OTHER PUBLICATIONS

International Search Report and the Written Opinion dated Jun. 29, 2016, International Application No. PCT/US2016/018750.

* cited by examiner

CONTACTLESS DATA EXCHANGE BETWEEN MOBILE DEVICES AND READERS INVOLVING VALUE INFORMATION NOT NECESSARY TO PERFORM A TRANSACTION

CROSS-REFERENCES TO RELATED APPLICATIONS

This application is a Non-Provisional application which claims the benefit of U.S. Provisional Application No. 62/118,726, entitled "DATA COMMUNICATION PROTOCOLS FOR NEAR FIELD COMMUNICATIONS BETWEEN MOBILE DEVICES AND READERS," filed Feb. 20, 2015, and Provisional Application No. 62/258,153, entitled "TRANSMISSION OF VALUE ADDED SERVICES DATA DURING A TRANSACTION," filed on Nov. 20, 2015, the disclosures of all applications being hereby incorporated by reference herein in their entirety and made part of this application for all purposes.

BACKGROUND

RFID (Radio-Frequency Identification) allows for contactless data exchanges between devices using radio waves. NFC (Near-Field Communication) is an example protocol that uses radio waves to send and/or receive data. Some mobile devices (e.g. smart phones, tablets) have integrated hardware to allow for contactless data exchanges consistent with NFC, for example. As mobile devices become ubiquitous, opportunities and contexts for using contactless data communication increases.

In some contexts, a contactless data exchange is executed to perform a transaction such as obtaining building access, sharing media, or completing a purchase, for example. In these transactions, transaction data is communicated or exchanged to execute the transaction. However, in some contexts, it is also desirable for additional data that is not necessary to complete the transaction to be communicated or exchanged.

In the case of payment transactions, a consumer may use a mobile device (e.g. a smartphone) to execute a contactless data exchange with an access device (e.g. Point of Sale terminal) to pay for a good or service. Additionally, a consumer may sometimes have coupons, promotional offers, loyalty identifiers, loyalty rewards, and other suitable value added services (VAS) data that can be applicable to the transaction although the VAS data is not necessary to complete the transaction. However, the consumer may sometimes forget to provide the VAS data. Or, the VAS data may be cumbersome to access if it is in a different mobile application or takes further, inconvenient user input to access on the mobile device. In the purchasing context, there is often a line of people waiting to complete their own payment transactions. Therefore, fumbling with a mobile device to access the VAS data in a separate data exchange that is additional to the payment details required to complete the transaction is inefficient.

Embodiments of the present invention are directed to methods and systems of data communication between mobile devices and access devices. Embodiments of the invention address these and other problems, individually and collectively.

BRIEF SUMMARY

Embodiments of the invention are directed to devices, systems, and methods of performing a transaction. In this disclosure, a mobile device and an access device may be used to facilitate a contactless data exchange of transaction data to perform a transaction. Value information that is not necessary to complete the transaction may also be communicated between the mobile device and the access device. The value information may be sent from the mobile device to the access device in an existing field of an existing transaction protocol.

In one embodiment, a method of performing a transaction with an access device is disclosed. The method includes receiving, by a mobile device, an available applications request from the access device and transmitting, by the mobile device, an available applications response to the access device. The mobile device receives a select application identifier request from the access device and transmits a select application identifier response to the access device. The method further includes receiving, by the mobile device from the access device, a transaction data request and providing, by the mobile device to the access device, a transaction data response. Value information not necessary to perform the transaction is included in the select application identifier response or the transaction data response. In one embodiment, the select application identifier request includes a provider identifier. The mobile device may identify the value information as being associated with the provider identifier.

In another embodiment, a method for performing a transaction includes transmitting, by an access device, an available applications request to a mobile device and receiving, by the access device, an available applications response from the mobile device. The access device transmits a selection application identifier request to the mobile device and receives a select application identifier response from the mobile device. The method further includes transmitting, by the access device, a transaction data request to the mobile device and receiving, by the access device, a transaction data response from the mobile device. Value information not necessary to perform the transaction is included in the select application identifier response or the transaction data response. The available applications response may include a list of applications of the mobile device for performing the transaction and the method may also include selecting, by the access device, a selected application from the list of applications to complete the transaction.

In one embodiment, an access device includes processing logic, an antenna coupled to the processing logic and a computer readable medium coupled to the processing logic. The computer readable medium includes instructions to cause the access device to perform operations to complete a wireless transaction including accessing a provider identifier associated with the access device and transmitting, by the antenna, a transaction data request to a mobile device. The transaction data request includes the provider identifier. Further operations include receiving, by the antenna, a reply to the transaction data request and receiving value information that is not required to complete the wireless transaction. The value information is associated with the provider identifier and the reply includes transaction data for completing the wireless transaction.

In some embodiments, the mobile device is a mobile phone. The transactions may be performed using near-field communication (NFC). The value information may be sent from the mobile device to the access device by appending the value information to the transaction data in existing fields of an existing transaction protocol.

These and other embodiments of the invention are described in further detail below.

DETAILED DESCRIPTION

Figure 1:
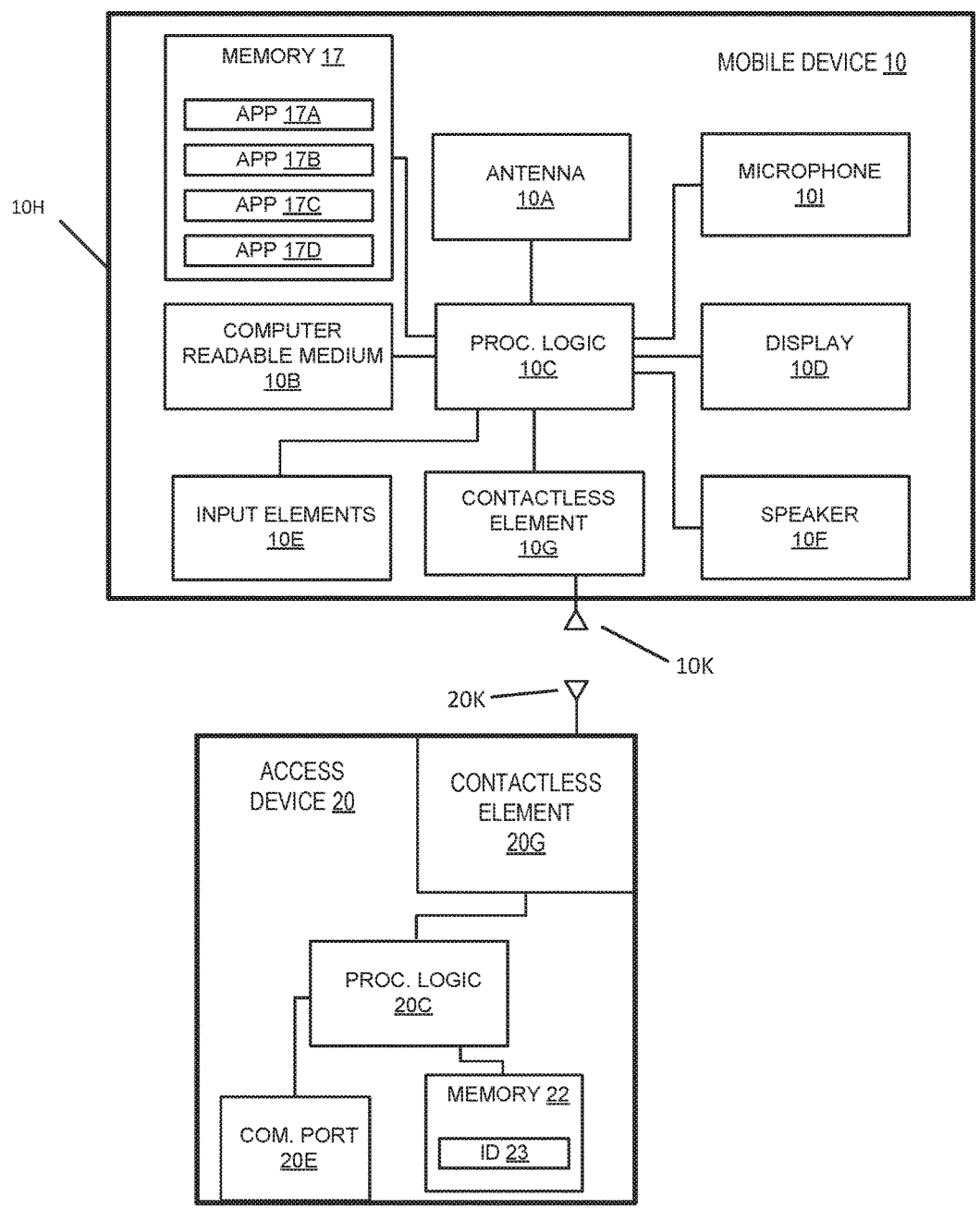
FIG. 1 shows a block diagram of a system including a mobile device and an access device, according to an embodiment of the invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for contactless transactions between mobile devices and access devices. In a contactless transaction, transaction data to perform the transaction may be communicated or exchanged. In a payment transaction, the transaction data may be account details to facilitate a purchase. However, value information that is not necessary to complete the payment transaction may be communicated with the transaction data. The value information may be relevant to the payment transaction and may even influence the transaction (e.g. influence price of the transaction). In one embodiment, value information includes a digital coupon that a buyer/consumer can apply to her purchase. In one embodiment, the value information includes a loyalty account number that accumulates points or rewards that may be redeemable for a loyalty reward in the future. The value information may be communicated in a contactless data communication by inserting the value information into an existing field of a defined contactless communication protocol that serves to communicate the transaction data.

Prior to discussing embodiments of the invention, description of some terms may be helpful in understanding embodiments of the invention.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "mobile application" may be a computing program that is used on a mobile device for a specific purpose. A mobile application may be designed, published, and updated by a bank, a merchant, a company, or otherwise.

An "access device" may be any suitable device that provides access to a remote system or to a site. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

The term "computer" as used herein refers to a system comprising a processor and a computer readable medium, such as computer memory or other data storage device, coupled to the processor. The computer readable medium stores code executable by the processor.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Processing logic" may refer to any suitable data computation device or devices such as a processor, field-programmable gate array, or otherwise. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein, a "provider identifier" may identify an entity, organization, building, or site. One example of a provider identifier is a "loyalty provider identifier" or "LPID," which may be an identifier associated with an entity that provides loyalty services. For example, merchants, transaction processors, acquirers, issuers, retail manufacturers, etc., may each provide different loyalty programs and services. Unique LPIDs may be associated with each different loyalty service provider, such that loyalty service providers can be easily identified and distinguished. An example of an LPID is "'A4 37 F2".

As used herein, "value information" describes information that is not necessary to complete a given transaction. The "value information" may be relevant to the transaction or even influence an aspect of the transaction, in some embodiments. One example of "value information" is "Value added services data" (or "VAS data"). VAS data can include data associated with a value added service. Examples of VAS data include loyalty identifiers, coupons, promotional offer information, digital wallet identifiers, etc. Several additional examples of VAS data are described in the table below:

|   | Value-Added Services Data | Tag | Description | Format |
|---|---|---|---|---|
| 1 | Merchant Proprietary VAS Data | 'DF01' | The merchant and Mobile Application are responsible for defining the format and content. | Variable (up to 256) |
| 2 | Payment Account ID | 'DF02' | The Payment Account ID is associated with the consumer PAN and linked to the tokens, which are issued by the Token Service Provider. | 16 digits |
| 3 | Digital Wallet Provider ID (DWP ID) | 'DF03' | This identifies the Digital Wallet Provider. The merchant may provide discounts and/or rewards and value to consumers based on their relationship with the Digital Wallet Provider. | 8 digits |

-continued

| | Value-Added Services Data | Tag | Description | Format |
|---|---|---|---|---|
| 4 | Merchant-Assigned Consumer Loyalty ID | 'DF04' | This Loyalty ID is issued by the merchant to the consumer and is processed by the POS. | Alphanumeric (variable up to 16) |
| 5 | Telephone Number | 'DF05' | The consumer's telephone number, which may be used as an alternate Loyalty ID for enrollment or merchant messaging. The POS and the Mobile Application may follow Personally Identifiable Information (PII) guidelines to store the consumer's telephone number. | 13 digits |
| 6 | Partner Loyalty ID | 'DF06' | The Loyalty ID of the merchant's partner, with whom consumers can earn rewards. | Alphanumeric (variable up to 16) |
| 7 | Email Address | 'DF07' | The consumer's email address can be used for receipts or enrollment. It cannot be used for QR codes due to payload size limitations, but can be used with other form factors. The POS and the Mobile Application may follow PII guidelines to store the consumer's email address. | String (variable up to 256) |
| 8 | Offers (multiple) 16 is the maximum number allowed | 'DF10'- 'DF1F' | The coupon or offer that can be locally redeemed by the merchant POS. | Alphanumeric (variable up to16) |
| 9 | Consumer Intent | 'DF08' | This field represents Consumer Intents, which is defined as flags in the field. Two Consumer Intents are defined: Intent to pay with points or rewards. Intent to redeem card-linked offers in the transaction. | |
| 10 | Order Confirmation Number | 'DF09' | This is the order number for remote order and pickup. | Alphanumeric (variable up to 16) |
| 11 | Employee ID | 'DF0A' | The merchant's employees have an Employee ID, which makes them eligible for special discounts. | Alphanumeric (variable up to 10) |
| 12 | ZIP Code | 'DF0B' | The ZIP code that may be used for the purchase card data provided at the POS. The POS and the Mobile Application may follow PII guidelines to store the consumer's ZIP code | Alphanumeric (variable up to10) |

As used herein, a "loyalty identifier" or "LID" may be an identifier associated with an entity that is enrolled in a loyalty program. For example, a user may enroll in a loyalty program offered by a merchant, and an LID may be associated with that user for that loyalty program. A single user may participate in multiple loyalty programs. Accordingly, a single user may be associated with multiple LIDs. An LID may be associated with one or more LPIDs. For example, a LID associated with a certain merchant may also be associated with that merchant's LPID.

In the following description, an "acquirer" is typically a business entity (e.g., a commercial bank) that has a business relationship with a particular merchant. An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

FIG. 1 shows a block diagram of a system 100 including a mobile device 10 and an access device 20, according to an embodiment of the invention. In some embodiments, the mobile device 10 may be a payment device that can be used to make payments or a device which can allow a user to gain access to a location. The exemplary mobile device 10 may comprise a computer readable medium 10B that can be present within the body 10H of the mobile device 10. The computer readable medium 10B may be in the form of a memory that stores data. In some cases, the memory 10B may also store information such as access data. In general, any of this information may be transmitted by the mobile device 10 to another device, using any suitable method, including the use of antenna(s) 10A or contactless element 10G. Antenna(s) 10A may be configured for mobile phone communication (e.g. 3G, 4G, and/or LTE) and wireless networking protocols such as IEEE (Institute of Electronics Engineers) 802.11. The body 10H may be in the form a plastic substrate, housing, or other structure. An antenna 10k of contactless element 10G may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism. Mobile device 10 may comprise components to both be the interrogator device (e.g. receiving data) and the interrogated device (e.g. sending data). Thus, the mobile device 10 may be capable of communicating and transferring data or control instructions via both cellular network (or any other suitable wireless network—e.g. the Internet or other data network) and short range communications.

The computer readable medium 10B may comprise instructions or code, executable by the processor for implementing a method of performing a transaction comprising receiving an available applications request from an access device, transmitting an available applications response to the access device, receiving a select application identifier request from the access device, transmitting a select application identifier response to the access device, receiving a transaction data request, and providing a transaction data response. Value information not necessary to perform the transaction is included in the select application identifier response or the transaction data response, in some embodiments. In some embodiments, the transaction is an access transaction to gain access to a building and the value information identifies a building that was accessed previously. In some embodiments, the transaction is a payment transaction and the value information is value added services (VAS) data. One example of VAS data is a coupon code for applying a discount to the payment transaction.

In some embodiments, the mobile device 10 may further include a contactless element 10G, which is typically implemented in the form of a semiconductor chip (or other data storage element) with an associated wireless transfer (e.g., data transmission) element, such as an antenna 10k. Contactless element 10G may be coupled to (e.g., embedded within) the mobile device 10.

The mobile device 10 may also include processing logic 10C (e.g., a microprocessor, field-programmable gate array) for processing the functions of the mobile device 10 and a display 10D to allow a consumer to see phone numbers and other information and messages. The mobile device 10 may further include input elements 10E (e.g. buttons, touchscreen) to allow a user to input information into the device, a speaker 10F to allow the user to hear voice communication, music, etc., and a microphone 10I to allow the user to transmit her voice through the mobile device 10.

A memory 17 may be coupled to the processing logic 10C and may store a first application 17A, a second application 17B, a third application 17C, and a fourth application 17D. The memory 17 may be in the form of one or more memory devices (e.g., RAM, EEPROM, ROM chips), using any suitable mode of data storage. In some embodiments, the memory 17 in the mobile device 10 may also include a secure storage area for storing sensitive data such as payment credentials (account numbers, payment tokens, verification values, etc.) and access data. For example, the memory 17 may be part of or may contain a secure element.

In some embodiments, the first application 17A is a mobile banking application. The mobile banking application may designed and maintained by a bank or payment processing network. The second application 17B may be a digital wallet application. The third application 17C may be designed and published by a first merchant and the fourth application 17D may be designed by a second merchant. Other applications not specifically mentioned may also reside in memory 17 of mobile device 10.

System 100 also includes an access device 20. Access device 20 includes a contactless element 20G, processing logic 20C, a memory 22, and a communication port 20E. Contactless element 20G is configured to communicate with (send and/or receive data) with contactless element 10G. Processing logic 20C is configured to facilitate data exchanges between contactless element 20G and contactless element 10G. Contactless element 20G includes antenna 20K for sending and receiving wireless signals. Memory 22 and a communication port 20E are coupled to processing logic 20C. In one embodiment, communication port 20E is wired (e.g. Ethernet). In one embodiment, the communication port 20E includes hardware to facilitate wireless network communication (e.g. IEEE 802.11). In the illustrated embodiment, identifier 23 is stored in memory 22. In one embodiment, identifier 23 is a provider identifier that identifies a merchant that is operating the access device. Identifier 23 may be programmable by writing different identifier data to memory 22. Identifier 23 may also be hard-coded into hardware of access device 20. Identifier 23 may be passed from access device 20 to mobile device 10 to identify access device 20. In response to receiving identifier 23, mobile device 10 may send value information associated with identifier 23 to access device 20, as will be described below.

Figure 2:
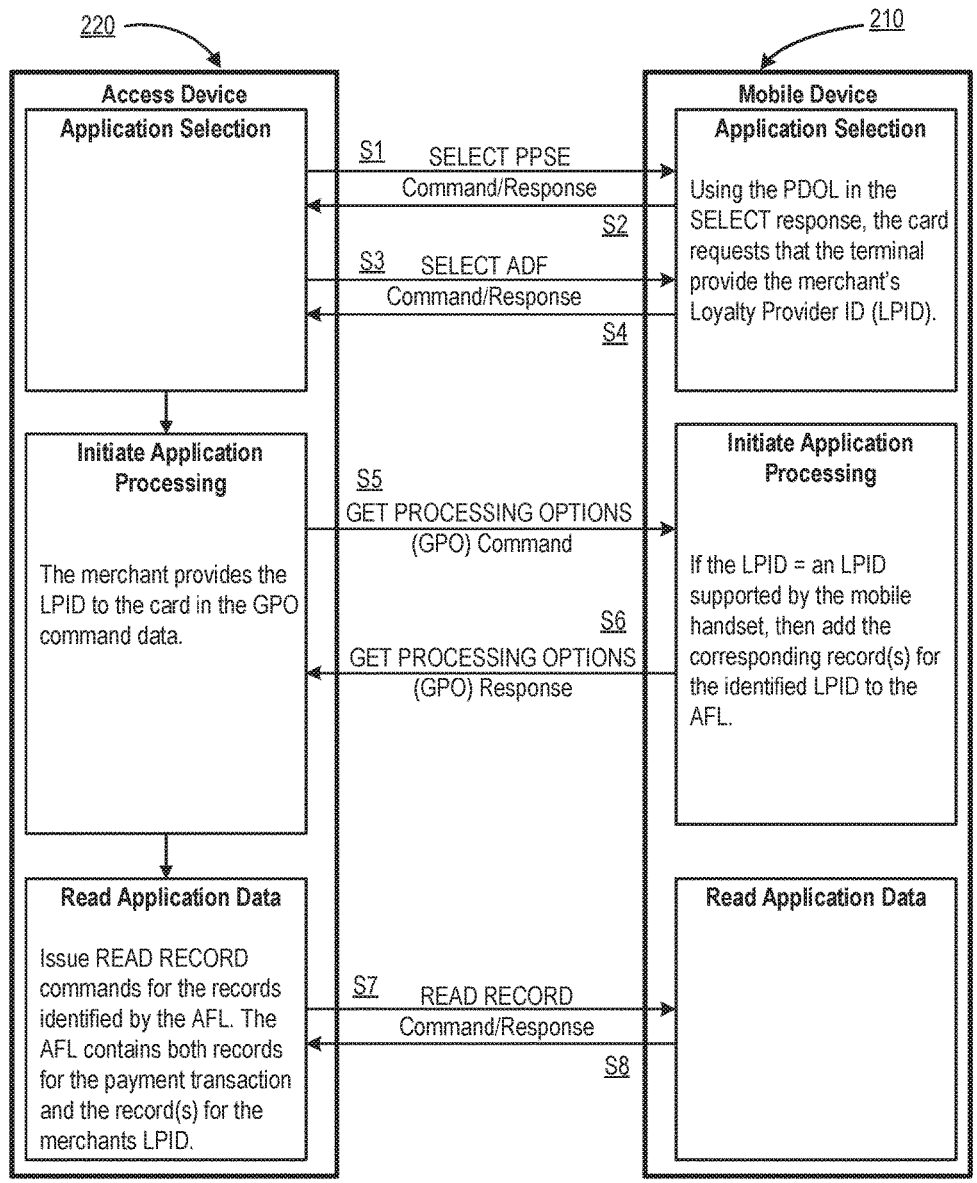
FIG. 2 shows a diagram of a first system and method, according to an embodiment of the invention.

FIG. 2 shows a diagram of a system and method, according to an embodiment of the disclosure. System 200 comprises an access device 220 which may be associated with a merchant. The system also comprises a mobile device 210 which may be associated with a user. Access device 220 and mobile device 210 may be configured similarly to access device 20 and mobile device 10, respectively. The user may be able to use mobile device 210 for conducting purchases at the merchant. For example, the mobile device 210 may be able to communicate with the access device 220 and/or provide payment credentials to the access device 220. The access device 220 can then submit the payment credentials into a transaction processing system in order to perform transaction authorization and other transaction processing. An example of such a transaction processing system can include a merchant computer, an acquirer computer, a transaction processing computer, and an issuer computer (none of which are shown in FIG. 2). The payment credentials may be sent to the transaction processing system via a communication port of the of access device 220 by a communication port similar to communication port 20E, for example.

The mobile device 210 may be able to communicate with the access device 220 via one or more communication pathways. For example, the mobile device 210 may be able to communicate with the access device 220 via contactless communications, such as NFC (Near Field Communication), BLE (Bluetooth Low Energy), RFID (Radio Frequency Identifier), or any other suitable form of short or medium range communications mechanism. In some embodiments, the mobile device 210 may also be able to generate and/or read QR codes.

The mobile device 210 and the access device 220 may also be able to communicate with other entities. For example, the mobile device 210 may be able to communicate with cell towers (e.g., via cellular communications such as GSM, LTE, 4G) and wireless routers (e.g., via WiFi).

Also, the access device 220 may be able to communicate with a merchant computer or other entities in a transaction processing system.

The mobile device 210 may store or have access to certain types of user information. For example, the mobile device 210 may store the user's payment credentials, such as a PAN (primary account number), a payment token, a name, an address, a CVV, an expiration date, and any other suitable information. Such data may be securely stored via hardware (e.g., a secure element) or software.

The mobile device 210 may also include a digital wallet application, which may include information about one or more user payment accounts. The user may be able to add payment accounts, set a default account, prepare the mobile device 210 for a payment, and perform other payment-related functions via the digital wallet application. In some embodiments, different payments account at the digital wallet application may be associated with different payment applications, and each payment application may be associated with an Application Identifier (AID).

The mobile device 210 may also store value added services (VAS) data, which is an example of value information that is not required to execute a payment transaction. The digital wallet application or a separate VAS application may include information about one or more loyalty programs, such as LIDs associated with the user. The digital wallet application or VAS application may also include coupon identifiers, promotional offer information, and any other suitable information associated with the user, the merchant, or transaction processing. In some embodiments, VAS data may be indexed based on one or more LPIDs and/or one or more payment applications with which the VAS data is associated. For example, an LID or coupon may be identifiable based on an associated LPID.

Figure 4:
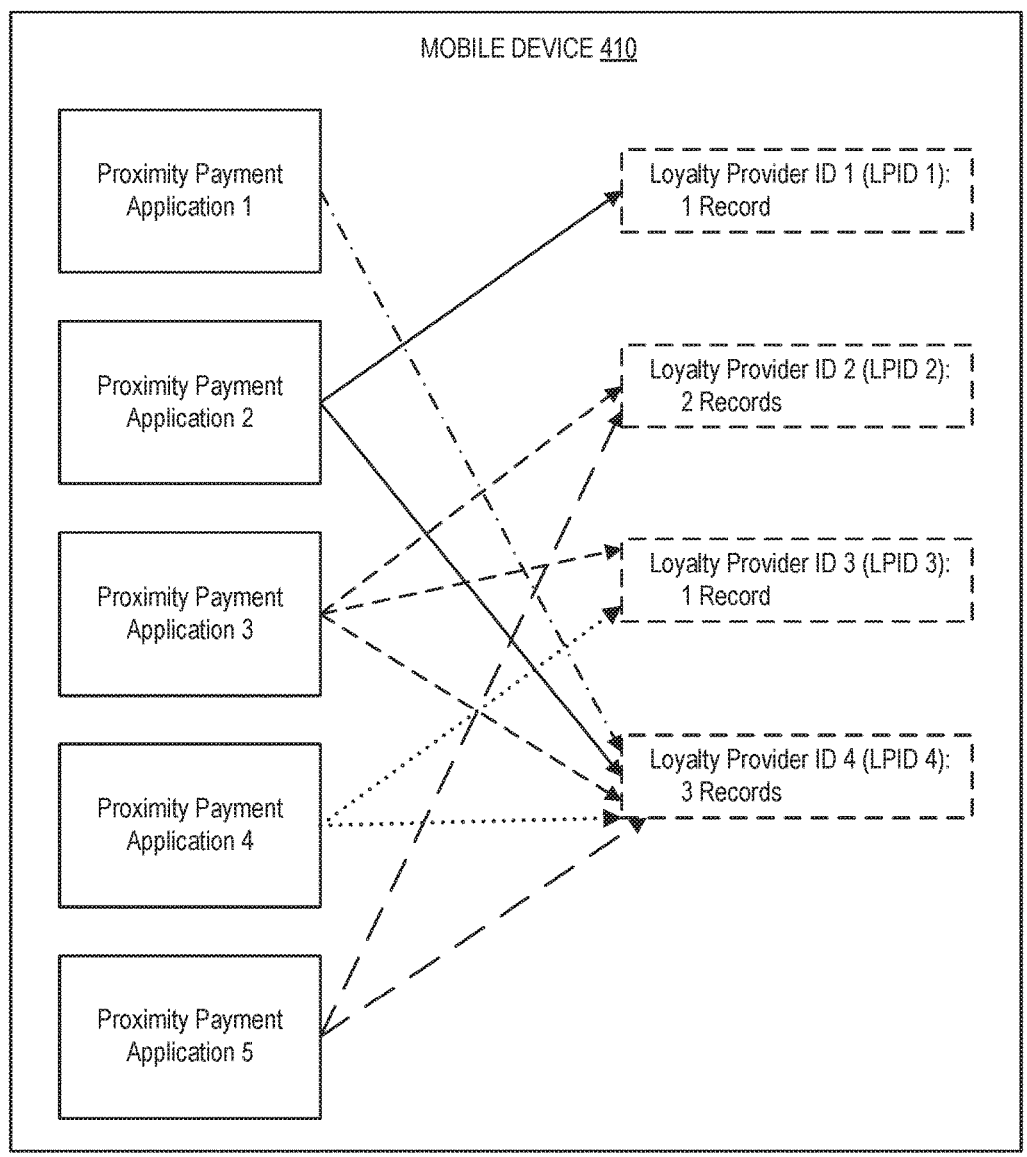
FIG. 4 shows an example diagram of links between different loyalty provider identifiers, payment applications, and VAS records, according to embodiments of the invention.

An example diagram of links between different LPIDs and payment applications is shown in FIG. 4. As shown, multiple VAS records (e.g., LIDS, coupons, etc.) can be associated with one LPID, and each LPID can be associated with multiple payment applications. The payment applications of mobile device 410 may be stored in a memory such as memory 17, for example. Additionally, the table 5-3 below provides another example of how proximity payment applications may be linked to VAS loyalty programs.

TABLE 0-1

Proximity Payment Applications and VAS Loyalty Links Example

|  | LPID 1 | LPID 2 | LPID 3 | LPID 4 |
|---|---|---|---|---|
| Payment App 1 |  |  |  | ✓ |
| Payment App 2 | ✓ |  |  | ✓ |
| Payment App 3 |  | ✓ | ✓ | ✓ |
| Payment App 4 |  |  | ✓ | ✓ |
| Payment App 5 |  | ✓ |  | ✓ |

In one embodiment, a payment card (e.g., a credit card or debit card) may be used to interact with an access device instead of a mobile device. For example, some payment cards may have chip-based data storage and/or contactless communication capabilities (e.g., NFC, BLE, RFID). Accordingly, some payment cards may be able to interact with the access device 220 of FIG. 2 as described below.

A method according to embodiments of the invention can also be described with respect to FIG. 2.

In order to initiate the method, the user may select one or more goods and/or services for purchase at a merchant, and then initiate a payment transaction. The user may choose to pay via mobile device 210. In some embodiments, the user may activate a digital wallet application, select a payment account, and initiate payment functionality. In other embodiments, the payment functionality may be automatic. In either case, the user may hold the mobile device 210 near to (e.g., within communication proximity of) the access device 220.

In some embodiments, a contactless transaction can then be carried out by exchanging messages (e.g., Application Protocol Data Unit (APDU) messages) between the mobile device 210 and the access device 220. The messages can be in the form of APDU commands sent from the access device 220 to the mobile device 210, and APDU responses sent from the mobile device 210 to the access device 220. As described in this method, NFC will be used for the communications. However, embodiments allow other communication means (e.g., BLE, RFID) to be used as well.

At step S1, when access device 220 detects the presence of the mobile device 120, the access device 220 may initiate a transaction by sending an available applications request to the mobile device 120 to request information on which mobile payment applications (e.g., a list of AIDs) may be available on the digital wallet application of mobile device 120. In some embodiments, the available applications request may be in the form of a select PPSE (proximity payment system environment) command. The available applications request may include a payment environment identifier (e.g., a PPSE name such as "2PAY.SYS.DDF01") to identify the payment environment supported by access device 220 and the mobile payment application.

At step S2, the mobile device 210 may respond by sending an available applications response back to access device 220. The available applications response may include a list of available AIDs, and may include the payment environment identifier (e.g., PPSE name). In some embodiments, the available applications response may be in the form of a select PPSE response.

At step S3, the access device 220 may select a suitable application from the list of applications received in the available applications response (e.g., by selecting an AID from the available AIDs). For example, the access device 220 may select a proximity payment application that is supported by both the access device 220 and the mobile device 210. The access device 220 may also send an application selection message with the selected AID to the mobile device 210. In some embodiments, the application selection can be in the form of a select AID (or ADF[AJV1]) command.

At step S4, the mobile device 210 may send a request for transaction data to the access device 220 which may be needed to execute the transaction using the selected application/AID. In some embodiments, the request may be in the form of a select AID (or ADF) response. The request may include a list of transaction data identifiers, and the list can be in the form of a processing options data object list (PDOL). The transaction data requested may include terminal transaction qualifiers (TTQ), authorized amount, other amount, terminal country code, terminal verification results, transaction currency code, transaction data, transaction type, and/or an unpredictable number. A request may also be included for the merchant's Loyalty Provider ID (LPID).

At step S5, the access device 220 may send the requested terminal transaction data. In some embodiments, the terminal transaction data may be sent in the form of a get processing options (GPO) command, and may include the requested terminal transaction data in a processing options data object list (PDOL). The transaction data may include an LPID associated with the merchant. Alternatively, if the access device 220 does not support VAS data, the GPO command may have a zero-value in place of an LPID.

At step S6, the mobile device 210 may generate dynamic transaction processing information using at least some of the received terminal transaction data, and send a set of transaction processing information to the access device 220. In some embodiments, the transaction processing information can be sent in the form of a GPO response. In some embodiments, the transaction processing information may include one or more application file locators (AFLs) that can be used as file addresses by access device 220 to read account data stored on mobile device 210.

Additionally, the mobile device 210 may identify VAS data, such as loyalty information and coupon information, based on the received LPID. For example, the mobile device 210 may identify a user loyalty ID (LID) that is associated with the LPID, as well as coupon identifiers and other promotional offers that may be associated with the merchant or the goods and services being purchased. The mobile device 210 may then add the identified VAS data to a file associated with the AFL that was sent to the access device 220, such that the access device 220 can retrieve the VAS data along with the account data.

In some embodiments, the mobile device 210 may be able to retrieve VAS data (e.g., loyalty information and coupons) from an online server over-the-air based on the LPID. For example, the user's VAS data may be stored on a digital wallet server. Further, in some embodiments, the mobile device 210 or digital wallet server may be able to search the web or consult a promotional offer database in order to locate new promotional offers and coupons based on the LPID. Accordingly, the mobile device 210 may be able to retrieve and utilize new VAS data (e.g., coupons) based on the LPID in real-time.

At step S7, the access device 220 may send an account data request to the mobile device 210 to read account data stored at the mobile device 210. In some embodiments, the account data request may be in the form of a read record command, and may include an application file locator (AFL) indicating the location of the account data.

At step S8, the mobile device 210 may send the account data to the access device 220. In some embodiments, the account data may be sent in the form of a read record response. The account data may include, for example, track-2 equivalent data and the cardholder name, and/or other account related data that is accessible at the AFL location. The account data may also include the identified VAS data (e.g., a loyalty ID, a coupon identifier, and/or promotional offer information).

In some embodiments, the mobile device 210 may send VAS data to the access device 220 in the place of existing data fields. For example, the mobile device may send an LID in the Card Holder Name (CHN) field. An example data stream is shown for this case:

....<CHN Tag> <CHN Length> <Merchant Assigned Consumer Loyalty ID TLV>....
....5F20 08 DF04 05 1234567890... .....
'5F20' : CHN tag
'08' : Length of data in CHN tag
'DF04' : Merchant Assigned Consumer Loyalty ID tag -continued '05' : Length of Loyalty ID
'1234567890' : Loyalty ID value At the access device 220, the data can be parsed and used for value-added services if the tag values read in the CHN and CED fields match a valid tags for one of the types of value added services. The payment authorization flow may be executed even if the merchant finds an error in the Merchant VAS data tags. The access device 220 can ignore the error found in the Merchant VAS data and continue with payment processing as if there is no Merchant VAS data available in the CHN and/or CED tags.

Having obtained the requisite data, the access device 220 may then utilize some or all of the obtained data elements (e.g., from the transaction processing information and the account data) to generate a transaction authorization request message. The access device 220 may also utilize the VAS data. For example, the access device 220 may reduce the transaction price based on a loyalty identifier, a coupon, rewards points, etc. The access device 220 may also update a loyalty account associated with the loyalty identifier (e.g., points may be credited to the user based on the current transaction).

In FIG. 2 (and FIG. 3, which is described below), communications such as the select PPSE request and response, select ADF request and response, get processing options request and response, and read record request and response are part of a payment data exchange process between the access device and the mobile device. The payment data exchange process is used when the mobile device is used to conduct a payment transaction with the access device. Because communications to obtain loyalty information are embedded within the messages in the payment data exchange process, embodiments of the invention do not require extra communications to pass loyalty information from the mobile device to the access device. Embodiments of the invention also allow the mobile device to identify the operator (e.g., a merchant) of the access device without requiring a separate step (e.g., requiring the user to input the name of the merchant into the mobile device).

Figure 3:
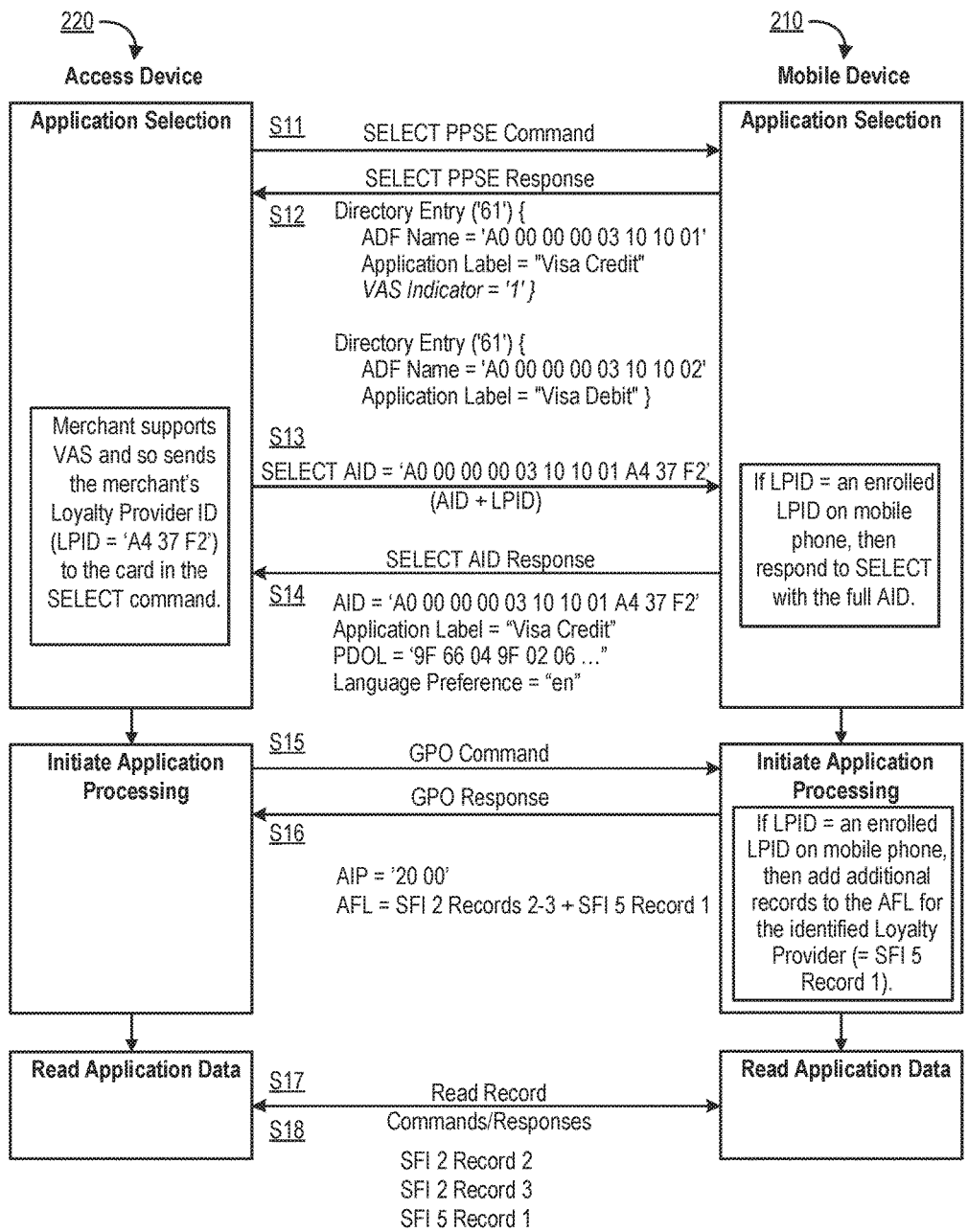
FIG. 3 shows a diagram of a second system and method, according to an embodiment of the invention.

Further embodiments of the invention can be described with respect to a system and method in FIG. 3. FIG. 3 also shows a method for transaction-related communications between the access device 220 and the mobile device 210. A difference between the method in FIG. 2 and the method in FIG. 3 is that the loyalty information communications occur in a different manner.

The method in FIG. 3 will now be discussed in order to describe an alternative manner for exchanging loyalty information. Several steps are similar to those in FIG. 2, and a detailed description of these steps need not be repeated. At step S11, the access device 220 sends an available applications request (e.g., a select PPSE command) to the mobile device 210.

At step S12, the mobile device 210 may respond by sending an available applications response (e.g., a select PPSE response) back to access device 220. In some embodiments, this response message may include a VAS indicator. The VAS indicator may indicate whether VAS information is stored and available at the mobile device 210. For example, the VAS indicator may be a Boolean-type value (e.g., with a value of '0' or '1').

At step S13, the access device 220 may determine, based on the VAS indicator, whether VAS data is available at the mobile device 210. If VAS data is available and the access device 220 supports VAS data, the access device 220 may send the merchant's LPID to the mobile device 210 in an application selection message (e.g., a select AID command). In some embodiments, the selected AID may be appended to include the LPID. For example, the AID may be "A0 00 00 00 03 10 10 01," the LPID may be "A4 37 F2," and the combined AID+LPID may be "A0 00 00 00 03 10 10 01 A4 37 F2."

At step S14, the mobile device 210 may determine whether there is any stored VAS data that is associated with the LPID. For example, if the user has a loyalty account at the merchant, there may be a user LID that is associated with and/or labeled by the LPID. The mobile device 210 may also send a request for transaction data (e.g., a select AID response) to the access device 220. If VAS data associated with the LPID was identified, the extended AID (i.e., the AID+LPID) may be included in the message.

Additionally, the mobile device 210 may add the identified VAS data to a file associated with an AFL that will be sent to the access device 220, such that the access device 220 can retrieve the VAS data along with the account data.

At step S15, the access device 220 may send the requested terminal transaction data (e.g., as a GPO command).

At step S16, the mobile device 210 may send a set of transaction processing information (e.g., a GPO response) to the access device 220. In some embodiments, the transaction processing information may include one or more application file locators (AFLs) that can be used as file addresses by access device 220 to read account data stored on mobile device 210. In some embodiments, an additional AFL may be included that refers to a file including the VAS data. For example, the message may include both a first AFL titled "SFI 2 Records 2-3," which refers to a first file including the account data, as well as a second AFL titled "SFI 5 Record 1," which refers to a second file including the identified VAS data.

At step S17, the access device 220 may send an account data request (e.g., one or more read record commands) to the mobile device 210 to read account data stored at the mobile device 210. The request may include one or more application file locators (AFL) indicating the location of the account data and/or the VAS data. For example, one or more requests may be sent that indicate a first AFL titled "SFI 2 Record 2," a second AFL titled "SFI 2 Record 3," and a third AFL titled "SFI 5 Record 1."

At step S18, the mobile device 210 may send the account data and/or the VAS data (e.g., via one or more read record responses) to the access device 220. An example of a VAS record with different VAS data elements that may be sent is shown in the table below. If there is no offline data authentication, the record may be associated with the AFL value "08030400". If there is offline data authentication, the record may be associated with the AFL value "0804040010020300".

| Command | Data Element Name |
| --- | --- |
| Read Record ('0104') | Record Template |
| | Merchant VAS Data Template |
| | Merchant Proprietary VAS Data |
| | Payment Account ID |
| | Digital Wallet Provider ID |
| | Merchant-Assigned Consumer Loyalty ID |
| | Telephone Number |
| | Partner Loyalty ID |
| | Email Address |
| | Consumer Intent |
| | Order Confirmation Number |
| | Employee ID |
| | ZIP Code |
| | Offer(s) |

Additionally, the following table provides examples of types of VAS data that may be sent to a merchant, as well as example tags for identifying the different data elements. The access device 220 may be able to recognize and process each of these tags and data elements.

| Name (Format; Tag; Length) | Description | Values |
| --- | --- | --- |
| F: b<br>T: 'BF64'<br>L: var. | A constructed data template that contains BER-TLV coded data elements representing Merchant Value-Added Services (VAS) data. | The following context-specific tags are defined in this document for the Merchant VAS Data Template and zero or more of the listed data elements may be present in the Merchant VAS Data Template:<br>'DF01': Merchant Proprietary VAS Data<br>'DF02': Payment Account ID<br>'DF03': Digital Wallet Provider ID<br>'DF04': Merchant Assigned Consumer Loyalty ID<br>'DF05': Telephone Number<br>'DF06': Partner Loyalty ID<br>'DF07': Email Address<br>'DF08': Consumer Intent<br>'DF09': Order Confirmation Number<br>'DF0A': Employee ID<br>'DF0B': ZIP Code<br>'DF1x': Offers (up to 16, where x = '0' to 'F')<br>The Merchant VAS Data Template may also include additional data elements not listed in this document. |

-continued

| Name (Format, Tag, Length) | Description | Values |
|---|---|---|
| Merchant Proprietary VAS Data<br>F: String<br>T: 'DF01'<br>L: Variable (256) | The merchant and Mobile Application can define the format and content. | |
| Payment Account ID<br>F: Numeric<br>T: 'DF02'<br>L: 16 digits | The Payment Account ID may be associated with the consumer PAN and linked to the tokens, which may be issued by the Token Service Provider. | |
| Digital Wallet Provider ID<br>F: Numeric<br>T: 'DF03'<br>L: 8 digits | This identifies the Digital Wallet Provider. The merchant may provide discounts and/or rewards and value to consumers based on their relationship with the Digital Wallet Provider. | |
| Merchant-Assigned Consumer Loyalty ID<br>F: Alphanumeric<br>T: 'DF04'<br>L: Variable (16) | This Loyalty ID may be issued by the merchant to the consumer and may be processed by the POS. | |
| Telephone Number<br>F: Numeric<br>T: 'DF05'<br>L: 13 digits | The consumer's telephone number, which may be used as an alternate Loyalty ID for enrollment or merchant messaging. The POS and the Mobile Application may follow Personally Identifiable Information (PII) guidelines to store the consumer's telephone number. | |
| Partner Loyalty ID<br>F: Alphanumeric<br>T: 'DF06'<br>L: Variable(16) | The Loyalty ID of the merchant's partner, with whom consumers can earn rewards. | |
| Email Address<br>F: String<br>T: 'DF07'<br>L: Variable(256) | The consumer's email address can be used for receipts or enrollment. The POS and the Mobile Application may follow PII guidelines to store the consumer's email address. | |
| Consumer Intent<br>F: Binary<br>T: 'DF08'<br>L: Variable (4 bytes) | This field represents Consumer Intent, which may be definded as flags in the field. Two Consumer Intents are definded:<br>1. Intent to pay with points or rewards.<br>Intent to redeem card-linked offers in the transaction. | |

| b8 | b7 | b6 | b5 | b4 | b3 | b2 | b1 | Usage |
|---|---|---|---|---|---|---|---|---|
| x | | | | | | | | Consumer intent to pay with points |
| | x | | | | | | | Consumer intent to redeem rewards |
| | | x | | | | | | Consumer intent to x |
| | | | x | | | | | Consumer intent to y |
| | | | | x | x | x | X | And so on . . . |

| Name (Format, Tag, Length) | Description | Values |
|---|---|---|
| Order Confirmation Number<br>F: Alphanumeric<br>T: 'DF09'<br>L: Variable(16) | This may be the order number for remote order and pickup. | |
| Employee ID<br>F: Alphanumeric | The merchant's employees may have an Employee ID, which may make them eligible for special discounts. | |

| | |
|---|---|
| T: 'DF0A' | |
| L: Variable(10) | |
| ZIP Code | The ZIP code that may be used for the |
| F: | purchase card data provided at the POS. The |
| Alphanumeric | POS and the Mobile Application may follow PII |
| T: 'DF0B' | guidelines to store the consumer's ZIP code. |
| L: Variable(10) | |
| Offer 1 | The coupon or offer that can be locally |
| F: | redeemed by the merchant POS. |
| Alphanumeric | |
| T: 'DF10' | |
| L: 16 | |
| Offer 2 | The coupon or offer that can be locally |
| F: | redeemed by the merchant POS. |
| Alphanumeric | |
| T: 'DF11' | |
| L: 16 | |
| Offer 3 | The coupon or offer that can be locally |
| F: | redeemed by the merchant POS. |
| Alphanumeric | |
| T: 'DF12' | |
| L: 16 | |

Having obtained the requisite data, the access device 220 may then utilize some or all of the obtained data elements (e.g., from the transaction processing information and the account data) to generate a transaction authorization request message. The access device 220 may also utilize the VAS data. For example, the access device 220 may reduce the transaction price based on a loyalty identifier, a coupon, rewards points, etc. The access device 220 may also update a loyalty account associated with the loyalty identifier (e.g., points may be credited to the user based on the current transaction).

Embodiments of the invention have a number of technical advantages. For example, in embodiments of the invention, existing NFC communication flows can be leveraged to include loyalty information communications, such that the mobile device may automatically provide relevant loyalty information and other VAS data along with payment credentials. Multiple rounds of command and response communications between the access device and mobile device already take place, so it may not require additional time or messaging to include the access device's LPID and the mobile device's loyalty information in the communications. This saves on the time it takes to communicate the loyalty information as well as saving energy that would have been required for a separate contactless communication to transmit the loyalty information. The energy savings may be especially beneficial for the battery-powered mobile device.

Further, since the mobile device receives information about the merchant LPID directly from the access device, separate systems (e.g., geolocation systems) for providing merchant identifying information to the mobile device may no longer be needed. From the user's perspective, loyalty information and payment credentials can thereby be provided with one "tap" (i.e., one instance of holding the mobile device up to the access device). This can be convenient and easy for the user, as the user may no longer need to manually retrieve, select, or provide loyalty information to the access device.

Figure 5:
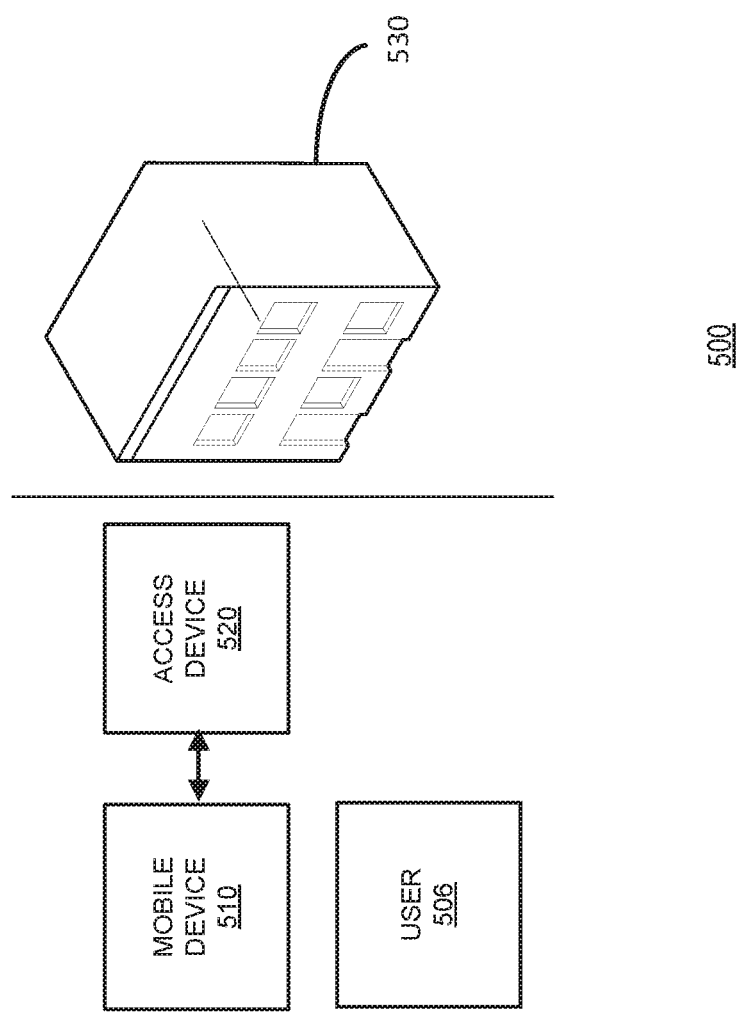
FIG. 5 shows a block diagram of a building access system, according to an embodiment of the invention.
Figure 6:
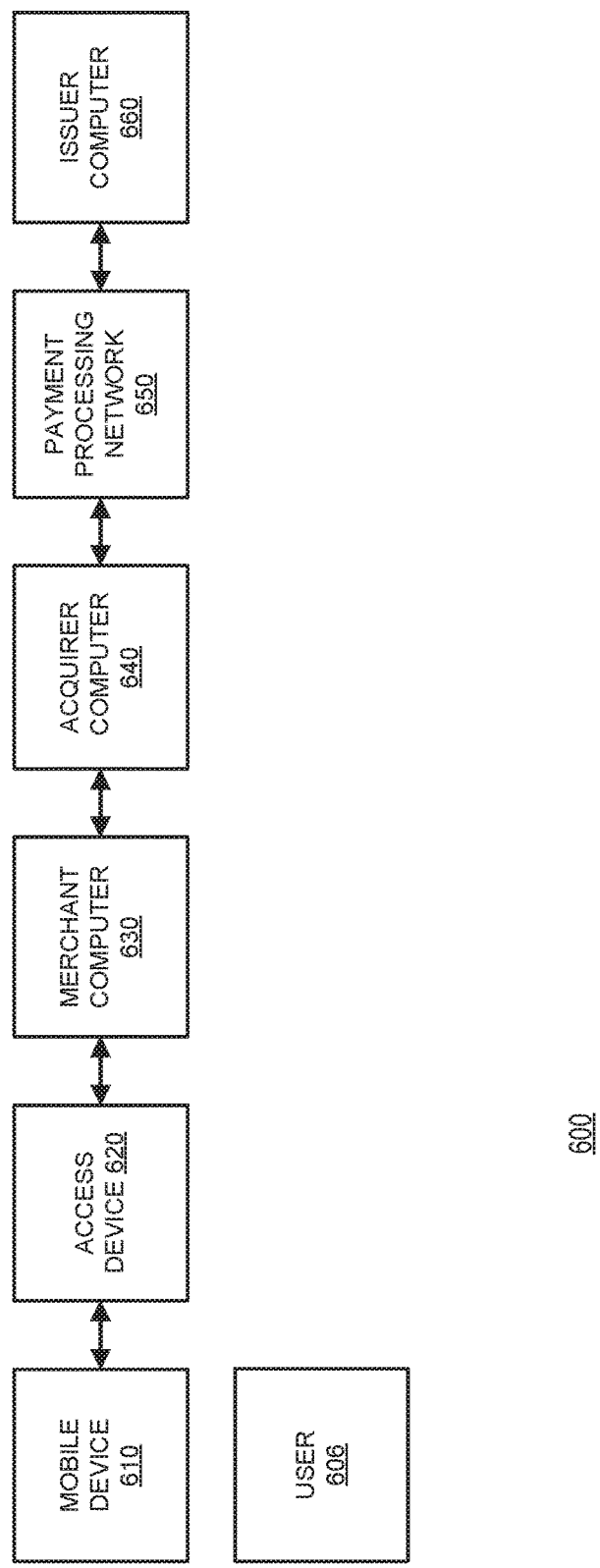
FIG. 6 shows a block diagram of a transaction processing system that can interact with a mobile device, according to embodiments of the invention.

FIGS. 5-6 respectively show transactions that can be conducted using the access device/mobile device interactions described above. FIG. 5 shows an interaction between a mobile device and an access device, where a user of the mobile device wants to enter a building or venue. FIG. 6 shows an interaction between a mobile device and an access device, where the user of the mobile device wants to conduct a payment transaction.

FIG. 5 shows a block diagram of a building access system 500, according to an embodiment of the invention. System 500 includes a mobile device 510, an access device 520, and a building 530. A user 506 may gain access to building 530 when an access transaction is completed between mobile device 510 and access device 520. The access transaction may include the exchange of transaction data for completing the access transaction. For example, the access device may interrogate mobile device 510 for access data to gain access to the building. The access device 520 may locally verify the received access data or it may communicate with a remotely located authentication server computer (not shown). The remotely located authentication server computer may verify that the access data is authentic and may transmit a signal indicating this back to the access device 520. The access device 520 may then proceed to let the user 506 enter the building 530.

The access data is the transaction data required to complete the access transaction. However, value information that is not necessary to complete the access transaction may also be communicated from the mobile device 510 to the access device 520. For example, access device 520 may provide a provider identifier to mobile device 510. Mobile device 510 provides the value information that is associated with the provider identifier to access device 520. For example, the value information may be the last building that was accessed by the mobile device. In one embodiment, the value information includes a coupon or notification for a purchase at a particular place in a venue. The value information may be included in a field of the access transaction and be communicated along with the access data. The value information may be stored in a particular mobile application that corresponds to the provider identifier.

FIG. 6 shows a block diagram of a transaction processing system 600 that can interact with a mobile device, according to embodiments of the invention. FIG. 6 shows a user 606 that can operate a mobile device 610. The user 606 may use the mobile device 610 to pay for a good or service at a merchant. The merchant may operate a merchant computer 630 and/or an access device 620. The merchant may communicate with an issuer computer 660 via an acquirer computer 640 and a payment processing network 650.

The payment processing network 650 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a mobile device 610 at an access device 620 (e.g. POS location) can be described as follows. A user 606 presents his or her mobile device 610 to an access device 620 to pay for an item or service. The mobile device 610 and the access device 620 interact such that access data from the mobile device 610 (e.g. PAN, a payment token, verification value(s), expiration date, etc.) is received by the access device 620 (e.g. via contact or contactless interface). The merchant computer 630 may then receive this information from the access device 620 via an external communication interface. The merchant computer 630 may then generate an authorization request message that includes the information received from the access device 620 (i.e. information corresponding to the mobile device 610) along with additional transaction information (e.g. a transaction amount, merchant specific information, etc.) and electronically transmits this information to an acquirer computer 640. The acquirer computer 640 may then receive, process, and forward the authorization request message to a payment processing network 650 for authorization.

In general, prior to the occurrence of a credit or debit-card transaction, the payment processing network 650 has an established protocol with each issuer on how the issuer's transactions are to be authorized. In some cases, such as when the transaction amount is below a threshold value, the payment processing network 650 may be configured to authorize the transaction based on information that it has about the user's account without generating and transmitting an authorization request message to the issuer computer 660. In other cases, such as when the transaction amount is above a threshold value, the payment processing network 650 may receive the authorization request message, determine the issuer associated with the mobile device 610, and forward the authorization request message for the transaction to the issuer computer 660 for verification and authorization. Once the transaction is authorized, the issuer computer 660 may generate an authorization response message (that may include an authorization code indicating the transaction is approved or declined) and transmit this electronic message via its external communication interface to payment processing network 650. The payment processing network 650 may then forward the authorization response message to the acquirer computer 640, which in turn may then transmit the electronic message comprising the authorization indication to the merchant computer 630, and then to the access device 620.

At the end of the day or at some other suitable time interval, a clearing and settlement process between the merchant computer 630, the acquirer computer 640, the payment processing network 650, and the issuer computer 660 may be performed on the transaction.

Figure 7:
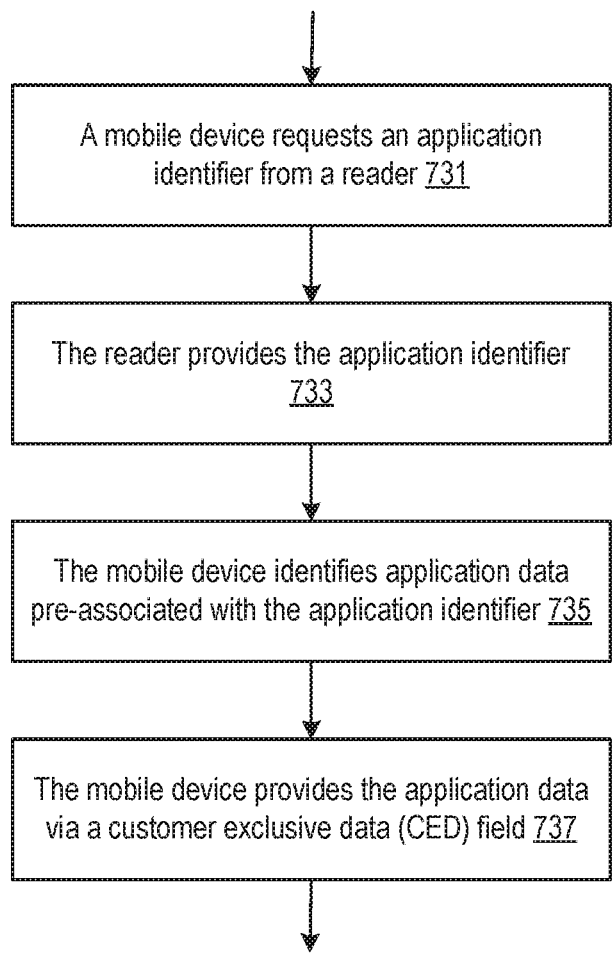
FIGS. 7-9 show example methods of exchanging value added services (VAS) data as part of a payment data exchange, according to embodiments of the invention.
Figure 8:
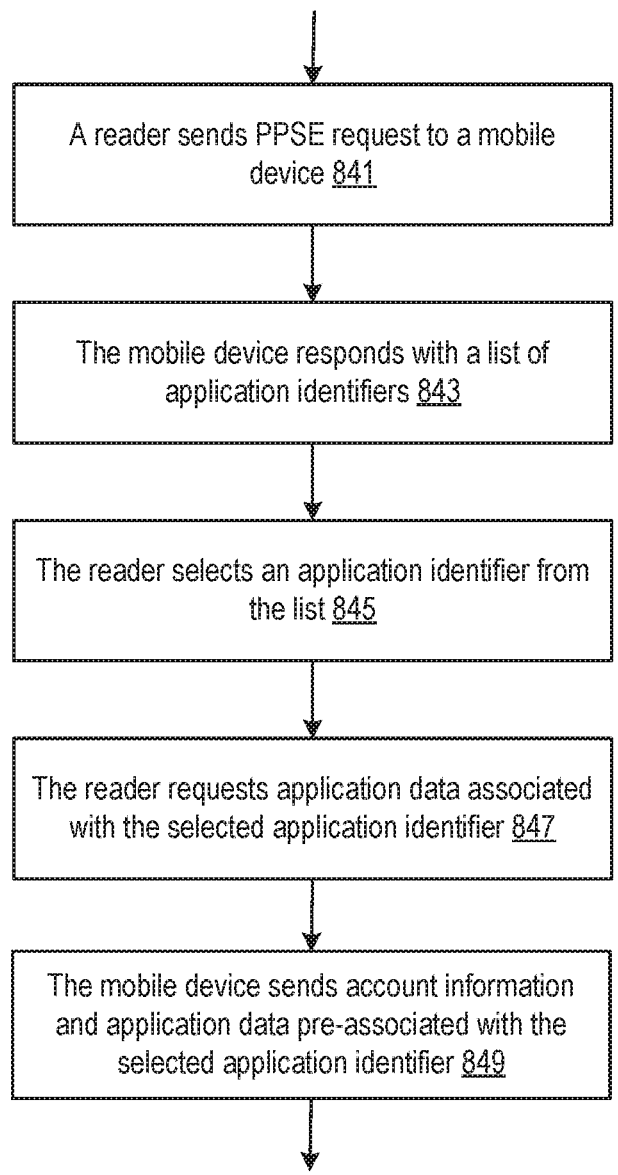
Figure 9:
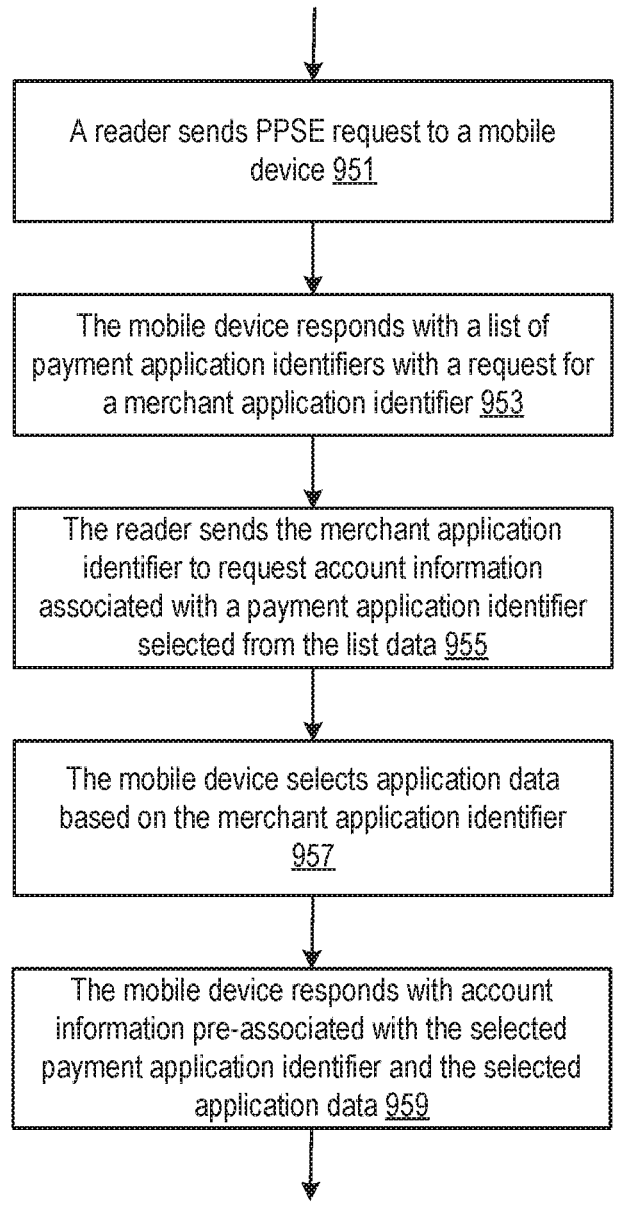

FIGS. 7-9 show example methods of exchanging value added services (VAS) data as part of a payment data exchange, according to embodiments of the disclosure. For example, the methods of FIGS. 7-9 can be implemented in systems 100, 200, 300, 500, and 600.

In FIG. 7, a mobile device requests (731) an application identifier from a reader. A reader is an example of an access device. The reader provides (733) the application identifier; the mobile device identifies (735) application data pre-associated with the application identifier; and the mobile device (737) provides the application data via a customer exclusive data (CED) field. In some embodiment, the application data is provided together with payment data in one NFC transmission from the mobile device to the reader.

In FIG. 8, a reader sends (841) a PPSE request to a mobile device; the mobile device responds (843) with a list of application identifiers; the reader selects (845) an application identifier from the list; the reader requests (847) application data associated with the selected application identifier; and the mobile device sends (849) account information and application data pre-associated with the selected application identifier.

In FIG. 9, a reader sends (951) PPSE request to a mobile device; the mobile device responds (953) with a list of payment application identifiers with a request for a merchant application identifier; the reader sends (955) the merchant application identifier to request account information associated with a payment application identifier selected from the list data; the mobile device selects (957) application data based on the merchant application identifier; and the mobile device responds (959) with account information pre-associated with the selected payment application identifier and the selected application data.

In one embodiment, the identifier 23 in FIG. 1 may be used by the mobile device 10 to select one of the VAS application identifiers. For example, the identifier 23 may be one of the VAS application identifiers pre-assigned to access device 20 to represent the VAS program supported by the access device 20. For example, the identifier 23 may be a merchant identifier or a loyalty program identifier that can be used by the mobile device 10 to match with one of the VAS application identifier.

In one embodiment, during a payment interaction between the mobile device 10 and the access device 20 to use the identifier 23 to make a payment between the access device 20 requesting the proximity payment system environment (PPSE) (817) and mobile device 10 transmitting the account information, the access device 20 transmits the identifier 23 to the mobile device 10. In response, the mobile device 10 identifies a matching VAS application identifier, retrieves the corresponding application data, and combines the retrieved application data with the payment data associated with the payment application identifier, including the payment information, and transmits the combined data in one transmission to the access device 20.

In another embodiment, after the access device 20 requests the proximity payment system environment (PPSE), the mobile device 10 transmits the list of application identifiers to the access device 20 for selection. Each of the list of application identifiers represents a unique combination of a payment application and a VAS application. The access device 20 uses the identifier 23 to select an applicable identifier from the list and requests the mobile device 10 to supply the data for the selected application identifier. In response, the mobile device prepares the data corresponding to the selected combination of the payment application and the VAS application and transmits the data in one transmission.

In addition to the embodiments that can be implemented in the building access and payment contexts, embodiments that may include just the payment contexts may include a method for performing a payment transaction with an access device where the method includes receiving, by a mobile device, an available applications request from the access device and transmitting, by the mobile device, an available applications response to the access device. The available applications response may include available payment applications for completing a payment transaction. The method may further include receiving, by the mobile device from the access device, a select application identifier request and transmitting, by the mobile device to the access device, a select application identifier response. The method may further include receiving, by the mobile device from the access device, a transaction data request and providing, by the mobile device to the access device, a transaction data response. The transaction data response may include transaction data that includes payment details, for example. VAS data not necessary to complete the transaction may be provided to the access device in the select application identifier response or the transaction data response.

In another embodiment specific to the payment context, a method of performing a payment transaction may include transmitting, by an access device, an available applications request to a mobile device and receiving, by the access device, an available applications response from the mobile device. The available applications response may include available payment applications for completing a payment transaction. The method may further include transmitting, by the access device, a select application identifier request to the mobile device and receiving, by the access device, a select application identifier response from the mobile device. The method may further include transmitting, by the access device, a transaction data request to the mobile device and receiving, by the access device, a transaction data response from the mobile device. The transaction data response may include transaction data that includes payment details, for example. VAS data not necessary to complete the transaction may be provided to the access device in the select application identifier response or the transaction data response.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for performing a transaction with an access device, the method comprising the following steps, in order:
   a) receiving, by a mobile device, an available applications request from the access device;
   b) transmitting, by the mobile device, an available applications response to the access device;
   c) receiving, by the mobile device from the access device, a select application identifier request, wherein the select application identifier request includes a provider identifier;
   c-1) retrieving, by the mobile device, value information not necessary to perform the transaction from a server by supplying the server with the provider identifier;
   d) transmitting, by the mobile device to the access device, a select application identifier response;
   e) receiving, by the mobile device from the access device, a transaction data request; and
   f) providing, by the mobile device to the access device, a transaction data response,
   wherein the value information not necessary to perform the transaction is provided to the access device in the select application identifier response or the transaction data response in steps d) or f); and
   wherein the mobile device stores, on the mobile device, value added services data including the retrieved value information not necessary to perform the transaction by indexing the value added services data based on the provider identifier and a payment application associated with an application identifier from the select application identifier request.

2. The method of claim 1, the method further comprising:
identifying, by the mobile device, the value information as being associated with the provider identifier; and
adding, by the mobile device, the value information to a file associated with an application file locator.

3. The method of claim 1, wherein the transaction data response includes a first application file locator and a second application file locator, the first application file locator for accessing transaction data to perform the transaction and the second application file locator for accessing the value information.

4. The method of claim 1, wherein the available applications response includes a value indicator, the value indicator indicating whether the mobile device has access to the value information.

5. The method of claim 1, wherein the value information is transmitted to the access device in a near-field communication (NFC) protocol.

6. A mobile device comprising:
processing logic;
an antenna coupled to the processing logic; and
a non-transitory computer readable medium coupled to the processing logic, wherein the non-transitory computer readable medium comprises instructions executable by the processing logic, the instructions causing the mobile device to perform operations to perform a transaction, the operations comprising:
a) receiving an available applications request from an access device;
b) transmitting an available applications response to the access device;
c) receiving a select application identifier request from the access device,
wherein the select application identifier request includes a provider identifier;
c-1) retrieving value information not necessary to perform the transaction from a server by supplying the server with the provider identifier
d) transmitting a select application identifier response to the access device;
e) receiving, from the access device, a transaction data request; and
f) providing, to the access device, a transaction data response,
wherein the value information not necessary to perform the transaction is provided to the access device in the select application identifier response or the transaction data response in steps d) or f); and
wherein the mobile device stores, on the mobile device, value added services data including the retrieved value information not necessary to perform the transaction by indexing the value added services data based on the provider identifier and a payment application associated with an application identifier from the select application identifier request.

7. The mobile device of claim 6, the non-transitory computer readable medium comprising further instruction causing the mobile device to perform further operations comprising:
identifying the value information as being associated with the provider identifier; and
adding the value information to a file associated with an application file locator.

8. The mobile device of claim 6, wherein the antenna is configured for near-field communication (NFC), and wherein the value information is transmitted to the access device in an NFC protocol.

9. The mobile device of claim 6, wherein the mobile device is a mobile phone.

10. The mobile device of claim 6, wherein the available applications response includes a value indicator, the value indicator indicating whether the mobile device has access to the value information.

11. A method for performing a transaction, the method comprising the following steps, in order:
a) transmitting, by an access device, an available applications request to a mobile device;
b) receiving, by the access device, an available applications response from the mobile device;
c) transmitting, by the access device, a select application identifier request to the mobile device, wherein the select application identifier request includes a provider identifier, the provider identifier usable by the mobile device for retrieving, from a server, value information not necessary to perform the transaction by supplying the server with the provider identifier;
d) receiving, by the access device, a select application identifier response from the mobile device;
e) transmitting, by the access device, a transaction data request to the mobile device; and
f) receiving, by the access device, a transaction data response from the mobile device,
wherein the value information not necessary to perform the transaction is provided to the access device in the select application identifier response or the transaction data response in steps d) or f); and
wherein the mobile device stores, on the mobile device, value added services data including the retrieved value information not necessary to perform the transaction by indexing the value added services data based on the provider identifier and a payment application associated with an application identifier from the select application identifier request.

12. The method of claim 11, wherein the available applications response includes a list of applications of the mobile device for performing the transaction, the method further comprising:
selecting, by the access device, a selected application from the list of applications to complete the transaction, the select application identifier response identifying the selected application.

13. The method of claim 11, wherein the transaction data response includes a first application file locator and a second application file locator, the first application file locator for accessing transaction data to perform the transaction and the second application file locator for accessing the value information.

14. The method of claim 11 further comprising:
accessing a provider identifier assigned to the access device; and
including the provider identifier in the select application identifier request, wherein the value information is included in the select application identifier response, the value information being associated with the provider identifier.

15. The method of claim 11, wherein the available applications response includes a value indicator, the value indicator indicating whether the mobile device has access to the value information.

16. The method of claim 15 further comprising:
determining whether the value indicator indicates that the mobile device has access to the value information; and including a provider identifier in the select application identifier request when the value indicator indicates that the mobile device has access to the value information.

17. The method of claim 16, wherein the select application identifier response includes the value information, the value information being associated with the provider identifier.

18. The method of claim 11, wherein the value information is transmitted to the access device in a near-field communication (NFC) protocol.

* * * * *